Nov. 18, 1969 K. L. HODGE 3,478,471
AUXILIARY LOCK FOR SLIDING MEMBERS
Filed March 13, 1968 2 Sheets-Sheet 1
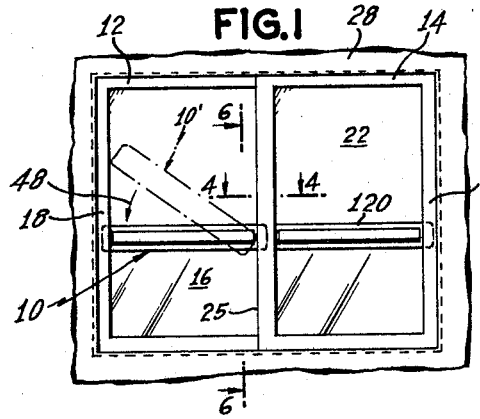
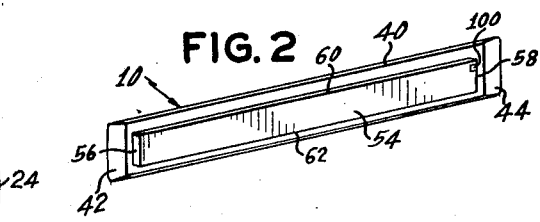
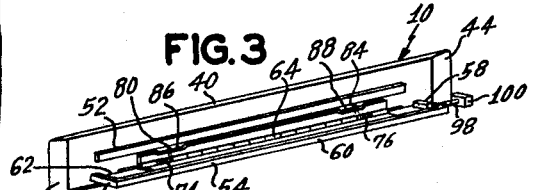
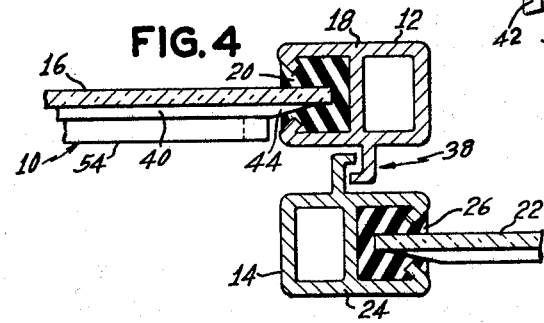
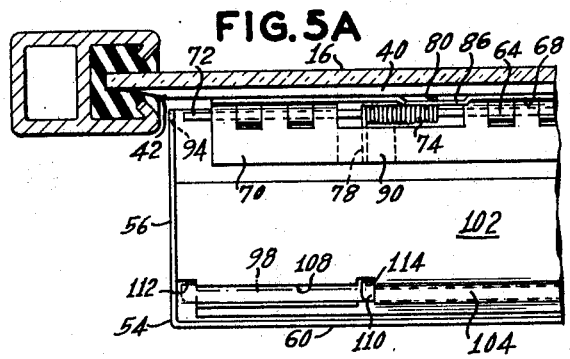
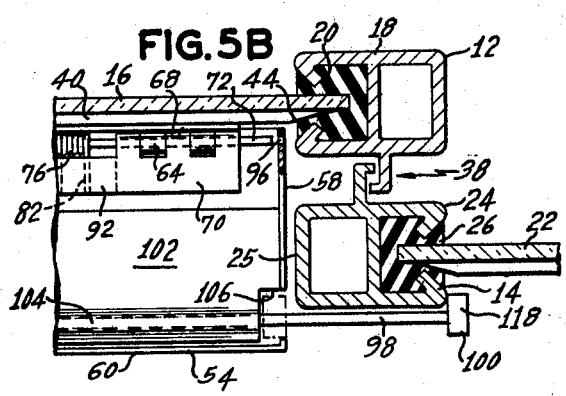
INVENTOR.
Keith L. Hodge
BY
George H. Baldwin
ATTORNEY

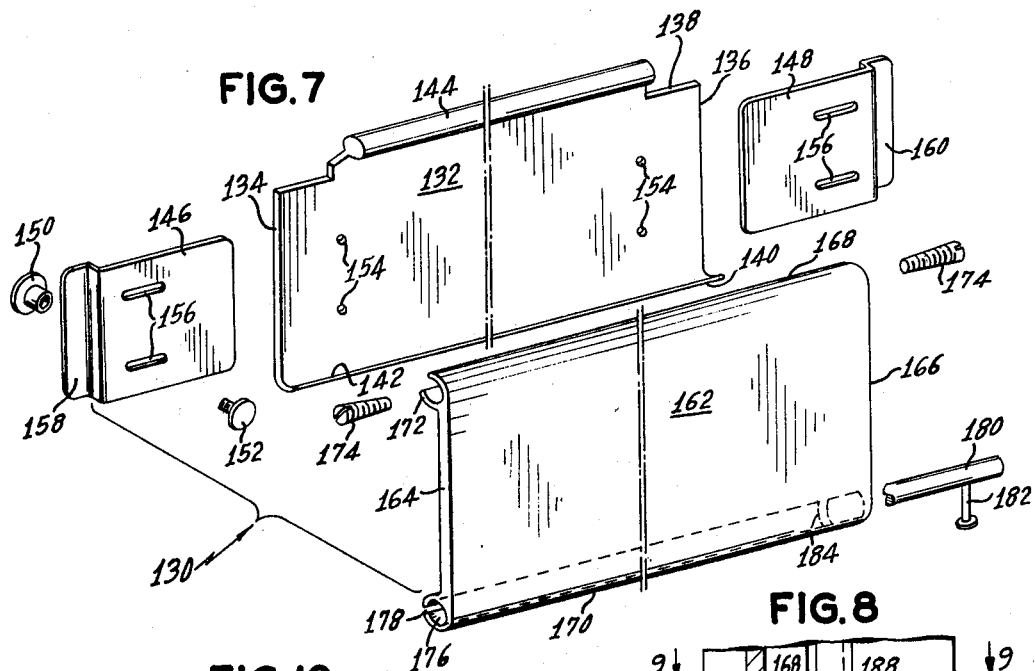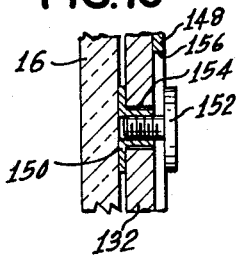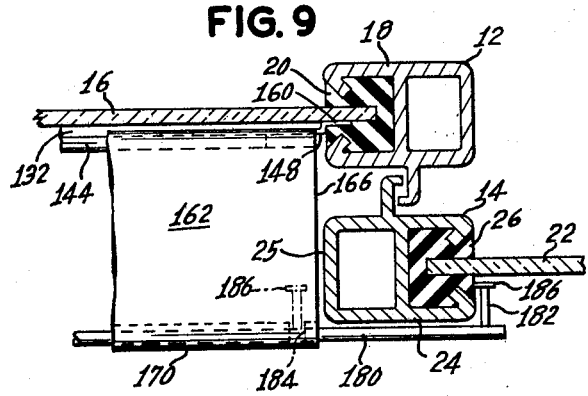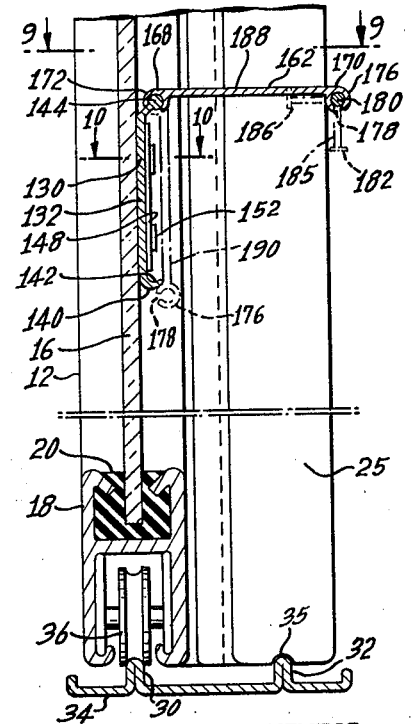

United States Patent Office 3,478,471
Patented Nov. 18, 1969

3,478,471
AUXILIARY LOCK FOR SLIDING MEMBERS
Keith L. Hodge, 205 NW. 10th Ave.,
Gainesville, Fla. 32601
Filed Mar. 13, 1968, Ser. No. 712,700
Int. Cl. E05c 7/00; E05d 13/00
U.S. Cl. 49—449                        14 Claims

ABSTRACT OF THE DISCLOSURE

An attachment for use in combination with a structural closure having front and rear planar sliding members within a frame, the rear member being slidable or fixed in the closure along a first plane and the front member being slidable in the closure closely adjacent the rear member and along a second plane parallel to the first plane. The attachment includes an elongated locking bar extending in a generally horizontal direction substantially the width of the rear member and an elongated plate connectable to the rear member and extending substantially the width of the rear member, the locking bar and the plate being pivotally connected together. The plate and the locking bar, when in its inoperative position, being located generally within the first plane, and the locking bar being pivotal outwardly and forwardly from its inoperative position into an operative blocking position in the second plane. One end of the locking bar when in its blocking position being closely adjacent one edge of the front member and the other end of the locking bar when in its blocking position being closely adjacent the frame thereby locking and substantially preventing relative opening movement of the front and rear members from their closed positions. Means engagable with the front sliding member are also provided to maintain the locking bar in its operative blocking position in the second plane.

BACKGROUND AND SUMMARY OF INVENTION

This invention relates to an improved, effective and readily operable locking device for a pair of sliding members. More particularly, the invention pertains to a locking mechanism having a manually operable locking bar which serves to prevent a pair of sliding doors, windows, or the like from being opened from the outside thereof. The locking mechanism of this invention is carried completely by only one of the pair of sliding members, and it may be readily and easily installed on and used in connection with an existing pair of sliding members.

The invention herein described is primarily directed to the construction of a locking device for so called patio doors of a building, such doors normally extending from adjacent the floor to a substantial height above the floor and being made of glass for decorative and utilitarian effects. The invention, however, is equally applicable to the kind of installation which uses large glass sliding panels such as for example some types of windows. In order to keep the explanation lucid and because the invention has particular advantages and applicability to patio doors reference herein will be directed mainly to such patio doors.

Patio doors as used today are set into frames of many different constructions and usually both panels of the patio doors move relative to each other. Considerable problems have been encountered in recent years with intruders breaking into homes through patio doors, the usual procedure being to force the lock of one of the sliding doors physically by leverage. Of necessity, such locks are required to be in the frame or jamb and thereby subject to breakage by leverage. At times entry into the home is afforded by forcing the doors upward and lifting them from their frame.

Another important problem with patio doors has been the danger of children or adults not familiar with the doors to walk into the doors thinking they are opened. Doors of tempered glass are quite expensive, and hence, as a general rule such doors are plate glass and very serious accidents have occurred because of the optical illusion of openness. Even birds have been known to attempt flying through patio doors thinking that the space was open.

Therefore, it is a general object of this invention to provide an improved lock for slidable closure doors and the like which is adapted to securely lock and hold one sliding closure element against a second similar sliding closure element to prevent relative movement therebetween.

Another general object of the invention is to provide a locking means particularly in connection with sectional sliding closures, such as for example, sliding doors, cabinet doors, lockers, garage doors, windows and similar types of sliding enclosure elements, which prevents unauthorized operation of the closures while at the same time providing a simple positive and easily manipulated lock capable of movement from a release to a locked position with a minimum of effort.

Still another general object of the subject invention is to provide in a closure which has a pair of transparent panels sliding one relative to the other, a locking device which can be swung from a first inoperative position which permits the sliding of one panel relative to the other, to a second operative position which prevents one panel from sliding relative to the other irrespective of whether the jamb locks are operated, the locking device further serving to warn of the existence of a glass or other transparent panel behind it.

Yet another object of this invention is to provide a locking device for a pair of sliding members which does not in any way interfere with the operation of the sliding members when it is not in its operative, locking position.

Yet a further object of the instant invention is to provide an improved locking device which can be easily and readily installed on and used in connection with an existing pair of sliding glass doors.

Still a further object of this invention is to provide an improved locking device for a pair of sliding glass doors which can be readily installed thereon without the necessity of additional hardware or without the necessity of modifying the existing doors in any manner, such as the drilling of holes and the like.

In general these objects are attained by providing in a structural closure including front and rear planar sliding members within a frame, the rear member being slidable in the closure along a first plane, the front member being in the closure closely adjacent the rear member and along a second plane parallel to the first plane, a locking means for locking said members in a position closing said structural closure. The locking means including plate means mounted on the rear member, an elongated locking bar connected to the plate means and extending substantially the width of said rear member in a generally horizontal direction. The plate means and the locking bar, in its inoperative position, are located generally within said first plane. Also means are provided pivotally connecting the locking bar to the plate means for pivoting the locking bar between its inoperative and operative positions. The locking bar is pivotal outwardly and forwardly from its inoperative position into an operative blocking position in the second plane. One end of the locking bar when it is in its blocking position being closely adjacent one edge of the front member and the other end of the locking bar when it is in its blocking position being closely adjacent the frame thereby locking and substantially preventing relative opening movement of the front and rear members from their closed positions.

DESCRIPTION OF THE DRAWINGS

The novel features which are believed to be characteristic of this invention are set forth with particularity in the appended claims. The invention itself, however, both as to its organization and method of operation may best be understood by reference to the following description taken in connection with the accompanying drawings, in which:

FIG. 1 is an elevational view of a pair of sliding glass doors, showing the installation of the auxiliary lock of this invention thereon;

FIG. 2 is a perspective view of the auxiliary lock of this invention, showing the same in its closed inoperative position;

FIG. 3 is a perspective view of the auxiliary lock of this invention, showing the same in its opened operative position;

FIG. 4 is an enlarged partial cross-sectional view taken along line 4—4 of FIG. 1;

FIG. 5A is an enlarged partial cross-sectional view taken along line 5—5 of FIG. 6, showing the left-hand end portion of one of the sliding doors.

FIG. 5B is an enlarged partial cross-sectional view taken along line 5—5 of FIG. 6, showing the right-hand end portion of the sliding doors of FIG. 5A;

FIG. 6 is an enlarged transverse-sectional view taken along line 6—6 of FIG. 1;

FIG. 7 is a perspective view of a second embodiment of the auxiliary lock of this invention, showing the same in disassembled form;

FIG. 8 is a view similar to FIG. 6, showing the second embodiment of the lock in cross-section and installed on the pair of sliding doors;

FIG. 9 is a partial cross-sectional view taken along line 9—9 of FIG. 8, and

FIG. 10 is an enlarged partial cross-sectional view taken along line 10—10 of FIG. 8.

DETAILED DESCRIPTION

Referred to the drawings in detail, the auxiliary or safety lock 10 of this invention is shown mounted on the outer door 12 of a pair of sliding glass doors 12 and 14. Door 12 includes a glass pane 16 which is recessed within a door frame 18 and sealed therein by a rubber sealing member 20. Similarly, door 14 includes a glass pane 22 which is set within a door frame 24 and sealed therein by a sealing member 26. The doors 12 and 14 are mounted within a wall 28 and slide along respective rails 30 and 32 of a track member 34, aided and guided by properly positioned grooves as at 35 and wheels or rollers as at 36, see FIG. 6. When the doors 12 and 14 are in closed position they meet and sealingly join each other as indicated at 38 in FIG. 4. The doors are further normally provided with handles or indentations (not shown) to receive the hand to aid in the opening and closing of the door.

The auxiliary lock 10 of the invention, as seen in particular in FIGS. 2 and 3, includes an elongated base member or plate 40 having tapered ends 42 and 44. Auxiliary lock 10 is intended to be mounted on the inside of the outer sliding glass door 12 with the base member or plate 40 thereof being positioned against the glass pane 16 with its tapered ends 42 and 44 being positioned between the glass pane 16 and the rubber sealing member 20 of door frame 18. Lock 10 is secured to the door 12 by first positioning the same in accordance with the dashed-line position as represented by reference numeral 10′ in FIG. 1, and then rotating the lock mechanism as indicated by the arrow 48 into the attached position shown in full lines in FIG. 1. The base member or plate 40 is further provided with an elongated reinforcing strip 52 which is positioned closely adjacent its center and extends from positions closely adjacent its beveled or tapered ends 42 and 44. The reinforcing strip or bar 52 tends to strengthen and rigidify auxiliary lock 10, and in particular base plate 40 thereof.

Auxiliary lock 10 further includes a locking bar 54, see in particular FIGS. 3, 5A, 5B and 6. Locking bar 54 has upturned end portions 56 and 58 and an upturned outer edge portion 60. Upturned outer end and edge portions 56, 58 and 60 not only strengthen and rigidify locking bar member 54, but also add to the appearance and asthetics of the auxiliary lock; such as by hiding other members and mechanisms therebeneath when the same is in the closed position (FIG. 2), thereby permitting the auxiliary lock 10 to present a pleasing appearance when installed on sliding door 12 as shown in FIG. 1. Locking bar 54 is pivotally attached along its inner edge 62 to base plate or member 40 by means of a continuous hinge 64. Locking bar 54 is pivotable about hinge 64 as indicated by the arrow 66 from its closed position as depicted in FIG. 2 to its opened or extended position as represented in FIG. 3. Hinge 64 extends along locking bar 54 from points closely adjacent the upturned end portions 56 and 58 thereof.

Hinge 64 includes a hinge member 68 attached to base plate or member 40, a second hinge member 70 attached to the locking bar 54 and a hinge pin or rod 72 extending through the hinge members 68 and 70 to connect the hinge member together. Hinge 64 further includes two coiled springs 74 and 76, being positioned on hinge rod 72 which passes through the center of the springs. Coiled springs 74 and 76 include respective spring legs 78 and 80, and 82 and 84 which are secured behind hinge members 68 and 70. The springs 74 and 76 are self-closing such that they constantly urge locking member 54 towards its closed position as depicted in FIG. 2. Hinge member 68 is formed with outwardly expanded portions 86 and 88 such that hinge spring legs 80 and 84 of respective springs 74 and 76 can be secured therebehind. In like manner hinge member 70 is formed with outwardly expanded portions at 90 and 92 such that spring legs 78 and 82 of respective springs 74 and 76 can be secured therebeneath. When the locking bar 54 is in its closed, inoperative position as depicted in FIG. 2 the hinge 64 and the coiled springs 74 and 76 are substantially hidden from sight, such that the auxiliary locking device 10 presents a pleasingly esthetic appearance. Base member or plate 40 and the outside of locking bar 54 could be finished in a design of pleasing appearance, such as a wood grain finish if desired.

The locking bar 54 is made slightly adjustable along base plate 40 in either direction such that the auxiliary locking device of this invention can be made to accommodate and is adaptable to a pair of sliding glass doors of slightly varying dimensions. To adjust locking member 54 in either direction the hinge rod or pin 72 is first removed from the hinge. Openings 94 and 96 are provided in respective upturned end portion 56 and 58 of locking member 54 to aid in the easy and ready removal of hinge rod 72. Once the hinge rod 72 has been removed the locking member 54 and attached hinge member 70 is shifted one hinge rung in either direction, as desired, and then the hinge rod 72 is replaced to extend through the hinge members 68 and 70 and through the center of the coil springs 74 and 76. In adjusting locking member 54 spring legs 76 and 82 are slidable within expanded portions 90 and 92 of hinge member 70 and spring legs 80 and 84 are slidable within their respective expanded portions 86 and 88 of hinge member 68.

With particular reference to FIGS. 5A, 5B and 6 now, the lock bar 54 further includes a locking rod 98 which is slidable along bar 54 and which has a locking member 100 attached to the end adapted to be positioned adjacent the inner door 14. Locking rod 98 is slidably secured to bar 54 by means of a plate member 102 which fits over the same and is secured to the bar 54. A passageway forming portion 104 is provided within plate member 102 in which the rod 98 is positioned and in which it slides.

A portion of locking bar 54 and its upturned end portion 58 is cut away at 106 to provide the reception of locking member 100 when the same is in its fully retracted position. A section of portion 104 of the plate member 102 is cut away at 108 to permit the ready grasping with a finger and movement of the end portion of locking rod 98. The end of rod 98 is provided with a catch 110 which is received by detent means 112 to hold rod 98 in its retracted position and detent means 114 to hold rod 98 in its fully extended position. Rod 98 is pivotable within portion 104 of plate member 102 such that locking member 100 may be pivoted to its position 116, as depicted in FIG. 6, when the same is being extended past frame member 24 of sliding door 14, and then pivoted to the locked position 118, as depicted in FIG. 5B, when the same has passed frame 24 of door 14 to thereby become locked to frame 24 of sliding door 14. When the locking member 100 and rod 98 are in the locked position as depicted in FIG. 5B, locking bar 54 is secured in its open, operative or locked position, thereby preventing the movement of either of the sliding glass doors 12 or 14. With the locking bar 54 in this operative or locking position, its end portion 58 will abut the outer edge 25 of frame 24 of door 14, and as bar 54 is secured to base plate 40, which in turn is fixedly positioned on sliding door 12, substantially no relative movement between the doors 12 and 14 can occur primarily in the direction along the track. Additionally when the locking member 100 and rod 98 are in the locked position as depicted in FIG. 5B substantially no jimming, spreading or separation can occur between doors 12 and 14 at their joining or meeting point at 38.

To add to the appearance, symmetry and styling of sliding doors 12 and 14, a sight bar 120 similar in appearance to lock 10 is installed on sliding door 14. The sight bar 120 does not have any of the working or locking mechanisms of lock 10. The sight bar 120 on door 14 is installed thereon in similar fashion to lock 10 which has been installed on door 12. When and if it is desired to remove locking device 10 or sight bar 120, they may be rotated opposite to arrow 48 to release them from the doors. If locking device 10 is permitted to remain in its closed inoperative position as depicted in FIGS. 2 and 4, the sliding doors 12 and 14 can be operated as normal without any interference or obstruction from the device. Lock 10 and sight bar 120 can be installed at any height on the doors, thus small children can be prevented from playing with, unlocking, or otherwise tamepring with the same.

Once the auxiliary locking device has been properly installed the first step in its use and operation is to close the sliding doors 12 and 14. Next the locking bar 54 of the device is open or folded downward against the force of coil springs 74 and 76 as depicted in FIGS. 3 and 5 such that its end portion 58 just clears frame 24 of door 14 when both doors 12 and 14 are in a closed position. The locking bar 54 is held in the opened position as depicted in FIG. 6 while the locking rod 98 and its locking member 100 are pivoted into position 116 (see FIG. 6) such that the same can be extended to by-pass the side of frame member 24 of door 14. When rod 98 and locking member 100 have been fully extended they are then pivoted into the position 118 (see FIG. 5B) such that locking member 100 is secured behind the inner edge of frame 24 of door 14. With the locking member 100 and rod 98 in this position locking bar 54 will remain in the open operative locking position such that the doors 12 and 14 are completely locked as to substantially prevent relative movement therebetween. When it is desired to release sliding doors 12 and 14 from the locked condition the above steps are repeated in reverse order. That is to say, locking member 100 and locking rod 98 are first released and moved to their completely retracted position, and then the locking bar 54 is permitted to close by the force of coiled springs 74 and 76, returning to its closed inoperative position as depicted in FIGS. 2 and 4.

A second embodiment 130 of the safety or auxiliary locks of this invention is depicted in FIGS. 7–10. Lock 130 of this embodiment includes a back plate or member 132 having opposite ends 136 and 136, a top edge portion 138 and a bottom edge portion 140. Bottom portion 140 is upturned to form a lip 142 therealong which tends to strengthen and rigidify back plate 132. Back plate further includes a member portion 144 of a continuous hinge which extends along top edge portion 138 of the back plate. Member 144 is offset to the front from the rest of back plate 132 in order that the hinge may properly function without interference from glass pane 16, see in particular FIG. 8, all of which will be explained more fully hereinbelow.

Adjustably connected to back plate 132 adjacent its respective ends 134 and 136 is a pair of thin end plates 146 and 148. End plates 146 and 148 are adjustably attached to back plate 132 by means of threaded screw housings 150 and screws 152 extending through holes or openings 154 in the back plate and elongated or oblong slots or openings 156 in the end plates, see FIGS. 7 and 10. End plates 146 and 148 include respective offset end portions 158 and 160 which are securable between the glass pane and the rubber sealing member to hold the entire auxiliary lock 130 in proper position on the sliding glass door at any desired vertical height; all of which can best be seen in FIG. 9, wherein end portion 160 of end plate 148 is shown positioned between glass pane 16 and rubber sealing member 20 within frame 18 of outer sliding glass door 12. Due to the adjustable attachment of end plates 146 and 148 to back plate 132 by employment of slots 56, back plate 132 is slightly adjustable in a horizontal direction along the glass pane 16 of sliding door 12.

Auxiliary lock 130 further includes a locking bar or front plate 162 having opposite ends 164 and 166, an upper edge portion 168 and a lower edge portion 170. Upper edge portion 168 has attached thereto a hinge member 172 which extends the entire length thereof and mates with hinge member 144 of back plate 132 to form a complete hinge between back plate 132 and locking bar 162, see FIG. 8. Small, headless, self-tapping screws 174 are provided which fit within hinge member 172 to secure locking bar 162 to back plate 132, and to make front plate 162 adjustable along hinge member 144 with respect to back plate 132. End portions of hinge member 144 are cut off such that short screws 174 may abut the ends of member 144 and still not protrude outward from the ends from hinge member 172. Locking bar 162 is adjustable with respect to back plate 132 by advancing one of screws 174 and backing-off on the other, or viceverse to make the adjustment in the opposite direction.

Attached to lower edge portion 170 of locking bar 162 and extending completely therealong is a slot or groove member 176 having an outwardly extending opening 178. A locking rod 180 having a laterally extending locking member 182 adjacent one end thereof fits within slot member 176 and is slidable and pivotable therein. Locking rod 180 is of a length shorter than that of groove member 176 such that rod 180 can be completely hidden within groove 176 when the lock is not in use. Additionally, a notch 184 is provided in the back portion of groove member 176 adjacent the locking member end thereof such that locking member 182 may be turned upward behind locking bar 162 to become hidden completely within lock 130 when the same is not in use.

The locking rod 180 and its attached locking member 182 can be extended outwardly from groove portion 176 within locking bar 162 and beyond frame 24 of sliding glass door 14 when locking member 182 is in the downward position 185 as indicated by dashed-lines in FIG. 8. Once locking member 182 has been extended beyond and cleared frame 24 of door 14, it is rotated into position 186 as depicted in FIGS. 8 and 9, to become secured behind door frame 24, thereby maintaining locking bar 162 in its opened, operative or locking position as depicted in FIGS. 8 and 9.

The installation of auxiliary lock 130, shown in the embodiment depicted in FIGS. 7–10 is identical with the installation of auxiliary lock 10, shown in the embodiment depicted in FIGS. 1–6. The one exception being that lock 130 includes adjustable end plates 146 and 148 which are adjustable along back plate 132 by loosing screws 152, and then re-tightening the same after the end plates have been properly positioned along back plate 132. The locking bar 162 of lock 130 is adjusted by trial and error in a horizontal direction along hinge member 144 of back plate 132 by means of adjusting small screws 174. Screws 174 are adjusted until end 166 of front plate 162 just clears outer edge 25 of frame 24 of inner sliding glass door 14 when the doors are in their sealed, closed positioned as depicted in FIG. 9.

Lock 130 as depicted in FIGS. 7–10 is operated in a manner nearly identical to the hereinabove explained operation of lock 10 of FIGS. 1–6. When lock 130 has been properly positioned on outer sliding glass door 12 at a desired height and properly adjusted such that end 166 of front plate 162 clears outer edge 25 of inner sliding glass door 14, the same may then be operated or placed in its locking position when desired. Since lock 130 is hinged at the top, instead of at the bottom as lock 10, gravity will maintain the same in its inoperative or closed position when not in use. The top hinge additionally deters children from grabbing and pulling down on the lock when it is in its operative position, which could damage the same. To operate lock 130 front plate 162 is swung upward into position 188 as depicted in FIG. 8, locking rod 180 is extended, with locking member 182 in the downward position 185 (see FIG. 8), until the same passes frame 24 of inner door 14, thereafter rod 180 and locking member 182 are rotated such that locking member 182 assumes position 186 (see FIGS. 8 and 9) thereby positioning locking member 182 behind door frame 24 to secure locking bar 162 in its opened, operative or locking position. The offsetting of hinge member 144 from back plate 132 permits the full opening of locking bar 162 into position 188 and the full closing of the same into the dashed-line position 190, all as depicted in FIG. 8, without interference from glass pane 16. When it is desired to unlock bar 162 from its operative position, the reverse of the above steps are carried out whereby locking bar 162 is returned to and held in its inoperative or closed position by means of gravity.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. An attachment for use in combination with a structural closure including an inner and outer planar member within a frame, the outer member being positioned in the closure along a first plane, the inner member being slidable in the closure closely adjacent the outer member and along a second plane parallel to the first plane, said attachment comprising an elongated locking bar extending substantially the width of the outer member and generally in a horizontal direction, means for attaching said locking bar to the outer member, said means for attaching and said locking bar when in its inoperative position being located generally within the first plane, said means for attaching including means for pivoting said locking bar between its operative and inoperative positions, said locking bar being pivotal laterally and inwardly of the closure from its inoperative position into an operative blocking position in the second plane, one end of said locking bar when in its blocking position being closely adjacent one edge of the inner member, the other end of said locking bar when in its blocking position being closely adjacent the frame thereby locking and substantially preventing unauthorized external opening movement of the inner and outer members from their closed and locked positions.

2. The attachment as defined in claim 1 wherein said means for attaching said locking bar to the outer member includes an elongated plate connectable to the outer member, said plate extending substantially the width of the outer member.

3. The attachment as defined in claim 2 wherein said means for pivoting said locking bar includes an elongated hinge extending along and between said locking bar and said elongated plate, said hinge having two hinge members and a pin connection therebetween, one of said hinge members being connected to said locking bar, the other of said hinge members being connected to said elongated plate.

4. The attachment as defined in claim 3 wherein said elongated hinge extends along the upper edge portion of each of said locking bar and said elongated plate whereby said locking bar is pivotal laterally and upwardly from said elongated plate.

5. The attachment as defined in claim 3 wherein said elongated hinge extends along the lower edge of each of said locking bar and said elongaed plate whereby said locking bar is pivotal laterally and downwardly from said elongated plate.

6. The attachment as defined in claim 5 further including spring means associated with said elongated hinge for urging said locking bar toward and into its inoperative position generally in the first plane.

7. In a structural closure including an inner and outer planar member within a frame, the outer member being positioned in the closure along the first plane, the inner member being slidable in the closure closely adjacent the outer member and along a second plane parallel to the first plane, the improvement comprising locking means for locking said members in a position closing said structural closure, said locking means including plate means mounted on said outer member, an elongated locking bar connected to said plate means and extending substantially the width of said outer member in a generally horizontal direction, said plate means and said locking bar in its inoperative position being located generally within said first plane, means pivotally connecting said locking bar to said plate means for pivoting said locking bar between its inoperative and operative positions, said locking bar being pivotal laterally and inwardly of the closure from its inoperative position into an operative blocking position in said second plane, one end of said locking bar when in its blocking position being closely adjacent one edge of said inner member, the other end of said locking bar when in its blocking position being closely adjacent said frame thereby locking and substantially preventing unauthorized external opening movement of said inner and outer members from their closed and locked positions.

8. In the structural closure as defined in claim 7 wherein said means pivotally connected said locking bar to said plate means includes an elongated plate extending substantially the width of said outer member and having opposite end portions, said outer member having side edge portions, said elongated plate end portions being attached to respective said side edge portions of said outer member.

9. In the structural closure as defined in claim 8 wherein a said inner and outer members are sliding glass doors and wherein each sliding glass door includes a door frame, a glass pane within said floor frame and surrounded by said door frame, and a resilient mounting member between said door frame and said glass pane, said opposite end portions of said elongated plate being wedgingly mounted to said outer sliding glass door side edge portions between its said glass pane and its said resilient mounting member.

10. In the structural closure as defined in claim 9 wherein said locking means includes adjustable means for adjusting said elongated locking bar along said elongated plate in a generally horizontal direction.

11. In the structural closure as defined in claim 9 further including a slidable locking member mounted to said elongated locking bar, said locking member being slidable toward and engageable with said door frame of said inner sliding glass door when said elongated locking bar is in its operative blocking position in said second plane, said locking member maintaining said locking bar in its operative blocking position in said second plane when said locking member is engaged with said door frame of said inner sliding glass door.

12. In the structural closure as defined in claim 9 wherein said elongated plate includes a body portion between its end portions, said elongated plate opposite end portions respectively include an adjustable thin end extension, means for adjustably mounting said extensions to said elongated plate body portion, the free end of each said end extension being wedgingly mounted to said outer sliding glass door side edge portion between its said glass pane and its said resilient mounting member whereby said elongated plate and said locking bar is adjustable in a generally horizontal direction along said outer sliding glass door.

13. In the structural closure as defined in claim 12 wherein said locking means includes adjustable means for adjusting said elongated locking bar along said elongated plate in a generally horizontal direction.

14. In the structural closure as defined in claim 12 further including a slidable locking member mounted to said elongated locking bar, said locking member being slidable toward and engageable with said door frame of said inner sliding glass door when said elongated locking bar is in its operative blocking position in said second plane, said locking member maintaining said locking bar in its operative blocking position in said second plane when said locking member is engaged with said door frame of said inner sliding glass door.

References Cited

UNITED STATES PATENTS 305,471   9/1884   Philbrook _____ 49—449 X

FOREIGN PATENTS 950,232   2/1964   Great Britain.
1,080,832   8/1967   Great Britain.

D. J. WILLIAMOWSKY, Primary Examiner

J. KARL BELL, Assistant Examiner

U.S. CL. X.R.

292—262